US012680813B2

(12) United States Patent
Lee et al.

(10) Patent No.: US 12,680,813 B2
(45) Date of Patent: Jul. 14, 2026

(54) DYNAMIC CHARACTERISTIC-REFLECTED SHORELINE EVALUATION SYSTEM AND METHOD THEREOF

(71) Applicant: KOREA INSTITUTE OF OCEAN SCIENCE & TECHNOLOGY, Busan (KR)

(72) Inventors: Moon Jin Lee, Daejeon (KR); Tae Sung Kim, Daejeon (KR); Yong Myung Kim, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 416 days.

(21) Appl. No.: 18/349,008

(22) Filed: Jul. 7, 2023

(65) Prior Publication Data

US 2024/0085179 A1     Mar. 14, 2024

(30) Foreign Application Priority Data

Sep. 14, 2022     (KR) ........................ 10-2022-0115582

(51) Int. Cl.
*G01C 13/00* (2006.01)
*G06Q 50/26* (2024.01)

(52) U.S. Cl.
CPC ......... *G01C 13/002* (2013.01); *G06Q 50/265* (2013.01)

(58) Field of Classification Search
CPC ........................... G01C 13/002; G06Q 50/265
USPC ....................................................... 702/189
See application file for complete search history.

(56) References Cited

U.S. PATENT DOCUMENTS 6,317,639 B1 *  11/2001  Hansen ................... H04W 4/70
                                                                700/83
8,238,658 B2 *  8/2012  Blain ................... G06V 20/182
                                                                382/199

FOREIGN PATENT DOCUMENTS

KR      10-2018-0037554 A     4/2018
KR         10-1848829 B1     5/2018
KR         10-1963320 B1     3/2019

OTHER PUBLICATIONS

Olanrewaju Lawal, "Geographic information systems-based expert system modelling for shoreline sensitivity to oil spill disaster in Rivers State, Nigeria", Journal of Disaster Risk Studies, Date Publish: Jul. 28, 2017 (Year: 2017).*

* cited by examiner

*Primary Examiner* — John H Le
(74) *Attorney, Agent, or Firm* — Knobbe, Martens, Olson & Bear, LLP

(57)     ABSTRACT

A dynamic characteristic-reflected shoreline evaluation system and a method thereof are proposed. The system may include a data collection processor configured to collect various types of information for shoreline evaluation with respect to an evaluation target region. The system may also include a shoreline evaluation processor configured to determine a shoreline rank by reflecting static characteristics and dynamic characteristics of the evaluation target region on a basis of data collected through the data collection unit. The system may further include an output processor configured to output the various types of information comprising an evaluation result of the shoreline evaluation unit and an overall process and result of the system. The system may further include a communication processor configured to transmit and receive various types of data through wired or wireless communication with an external device. The sys- (Continued)

tem may include a controller configured to control an overall operation of the system.

5 Claims, 4 Drawing Sheets

FIG. 1

| ESI rank | | Shoreline shape | General characteristics |
|---|---|---|---|
| 1 | | – vertical rock cliff shores exposed to waves<br>– concrete, wood, and metallic breakwaters and docks exposed to waves<br>– wave-corrodible upright shore protection exposed to waves | – shores powered by high wave energy<br>– geological feature composition from which oil is not leached<br>– slope of intertidal zone is 30 degrees or more |
| 2 | | – bedrock exposed to waves<br>– gently sloped rocky shore<br>– steep-slope sedimentary shores exposed to waves | – shores powered by high wave energy<br>– mostly less permeable geological feature composition<br>– slope of intertidal zone is 30 degrees or less |
| 3 | | – fine-grained sandy shores<br>– non-solidified fine-grained shores having slope exposed to waves | – oily semi-permeable and hard geological features<br>– length of oil permeation is about 10 cm or so<br>– slope of intertidal zone is 5 degrees or less |
| 4 | | – coarse grained sand | – oil-permeable sedimentary geology<br>– oil permeation is about 25cm or more |
| 5 | | – shores with mixture of sand and pebbles | – sedimentary layer with high oil permeability allowing oil to permeate up to about 50 cm<br>– easily buried due to high mobility of sediments during storms |
| 6 | 6A | – pebble shores<br>– shores composed of coast pebbles, mixed with pebbles and rocks, and permeable riprap between pebbles and rocks | – sedimentary layer with high permeability to oil that may permeable up to about 1 m |
| | 6B | – breakwaters and artificial shore protection, which have permeable seams | – oil permeates between seams, allowing outflow and inflow due to tidal differences |
| 7 | | – shores with rocks, gravel, sediment, or man-made artificial structure that are semi-enclosed and have weak waves | – slope is 15 degrees or more and intertidal zone is short<br>– geology, slope, and permeability vary greatly depending on region |
| 8 | 8A | – foreshores | – high biodensity with slopes 3 degrees or less<br>– mud sedimentary layer with low oil permeability, but with many many pores, allowing oil inflow |
| | 8B | – salt marsh | – wetland regions with different types of plants<br>– regions with very high bioproductivity<br>– high species diversity |

DYNAMIC CHARACTERISTIC-REFLECTED SHORELINE EVALUATION SYSTEM AND METHOD THEREOF

CROSS REFERENCE TO RELATED APPLICATION

The present application claims priority to Korean Patent Application No. 10-2022-0115582, filed Sep. 14, 2022, the entire contents of which is incorporated herein for all purposes by this reference.

BACKGROUND

Technical Field

The present disclosure relates to an apparatus and a method thereof for evaluating a shoreline to determine a rank thereof and, more particularly, to a dynamic characteristic-reflected shoreline evaluation system and a method thereof configured to determine a shoreline rank by reflecting dynamic characteristics of a corresponding shore along with static evaluation based on an existing ESI rank in order to solve problems of a shoreline evaluation method based on the Environmental Sensitivity Index (ESI) of the related art having limitations that make the method unable to perform effective response in an event of coastal pollution due to determining the shoreline rank in a static method based simply on a shoreline shape without reflecting the dynamic characteristics of a shore even though dynamic shoreline evaluation along with static shoreline evaluation is essentially required in general for pollutant removal and shore restoration in the event of coastal pollution, thereby enabling the shoreline evaluation reflected with both of the static and dynamic characteristics of the shore to be performed.

In addition, as described above, the present disclosure relates to a dynamic characteristic-reflected shoreline evaluation system and a method thereof configured to determine the shoreline rank by reflecting, in addition to the shoreline evaluation based on the existing ESI rank, the coastal dynamic characteristics such as seawater flow characteristics including flow velocities, flow directions, and spatial distributions of tidal currents, sea currents, and offshore currents, wave characteristics including wave heights and wave breaker zones, and sea level characteristics including approximate lowest low water, approximate highest high water, extreme sea level heights, and the like, in order to solve the problems of the shoreline evaluation method based on the ESI rank of the related art having limitations that make the method unable to effectively and practically perform the shoreline evaluation because of not reflecting the dynamic characteristics of a shore due to merely considering the static characteristics based simply on a shoreline shape, thereby enabling more effective and practical shoreline evaluation to be performed by reflecting both of the static and dynamic characteristics of the shore.

In addition, as described above, the present disclosure relates to a marine response system and a method thereof configured to perform a process of determining a shoreline rank by using a dynamic characteristic-reflected shoreline evaluation system and a method thereof configured to reflect both static characteristics and dynamic characteristics of a shore and perform more effective and practical shoreline evaluation, and a process of establishing a response plan by creating a response information map (i.e., an ESI Map)

according to a shoreline evaluation result, thereby enabling response work for pollutants to be performed more quickly and efficiently.

DESCRIPTION OF RELATED TECHNOLOGY

Recently, as industrial development and economic scale have increased, trade, cargo transportation, or the like through the ocean have increased worldwide, and accordingly, marine accidents such as collision or sinking of ships occur frequently.

SUMMARY

One aspect is a dynamic characteristic-reflected shoreline evaluation system and a method thereof configured to determine a shoreline rank by reflecting dynamic characteristics of a corresponding shore in order to solve problems of a shoreline evaluation method based on the Environmental Sensitivity Index (ESI) of the related art having limitations that make the method unable to perform effective response in an event of coastal pollution without reflecting the dynamic characteristics of the shore due to determining the shoreline rank in a static method based simply on a shoreline shape even though dynamic shoreline evaluation along with static shoreline evaluation is essentially required in general for pollutant removal and shore restoration in the event of coastal pollution, thereby enabling the shoreline evaluation reflected with both of the static and dynamic characteristics of the shore to be performed.

Another aspect is a dynamic characteristic-reflected shoreline evaluation system and a method thereof configured to determine the shoreline rank by reflecting, in addition to the shoreline evaluation based on an existing ESI rank, the coastal dynamic characteristics such as seawater flow characteristics including flow velocities, flow directions, and spatial distributions of tidal currents, sea currents, and offshore currents, wave characteristics including wave heights and wave breaker zones, and sea level characteristics including approximate lowest low water, approximate highest high water, extreme sea level heights, and the like, in order to solve the problems of the shoreline evaluation method based on the ESI rank of the related art having limitations that make the method unable to effectively and practically perform the shoreline evaluation by merely considering the static characteristics based simply on a shoreline shape, thereby enabling more effective and practical shoreline evaluation to be performed by reflecting both of the static and dynamic characteristics of the shore.

Another aspect is a marine response system and a method thereof configured to perform a process of using the dynamic characteristic-reflected shoreline evaluation system and the method thereof configured to perform a process of determining a shoreline rank by using a dynamic characteristic-reflected shoreline evaluation system and a method thereof configured to reflect both static characteristics and dynamic characteristics of a shore and perform more effective and practical shoreline evaluation, and a process of establishing a response plan by creating a response information map (i.e., an ESI Map) according to a shoreline evaluation result, thereby enabling response work for pollutants to be performed more quickly and efficiently.

Another aspect is a dynamic characteristic-reflected shoreline evaluation system, the system including: a data collection unit configured to perform a process of collecting various types of information for shoreline evaluation with respect to an evaluation target region; a shoreline evaluation unit configured to perform a process of determining a shoreline rank by reflecting static characteristics and dynamic characteristics of the evaluation target region on a basis of data collected through the data collection unit; an output unit configured to perform a process of outputting the various types of information including an evaluation result of the shoreline evaluation unit and an overall process and result of the system; a communication unit configured to perform a process of transmitting and receiving various types of data through wired or wireless communication with an external device; and a controller configured to perform a process of controlling an overall operation of the system.

Here, the data collection unit may be configured to perform a process of receiving, through a separate input means, an input of the various types of data including static characteristic data for the static characteristics and dynamic characteristic data for the dynamic characteristics of the evaluation target region, or a process of creating a database for the static characteristics and dynamic characteristics of the evaluation target region by receiving the various types of data from an outside through the communication unit.

In addition, the static characteristic data may be organized to include Environmental Sensitivity Index (ESI) rank information for the evaluation target region, and the dynamic characteristic data may be organized to include flow characteristic information, wave characteristic information, and sea level characteristic information for the evaluation target region.

In addition, the flow characteristic information may be organized to include information on current velocities, current directions, and spatial distributions of tidal currents, sea currents, and offshore currents in the evaluation target region, the wave characteristic information may be organized to include information on wave heights and breaking wave zones in the evaluation target region, and the sea level characteristic information may be organized to include information on approximate lowest low water, approximate highest high water, and extreme sea level heights of the evaluation target region.

Further, the shoreline evaluation unit may be configured to perform a process of generating an ESI rank determination result reflected with both of the static characteristics and dynamic characteristics by way of reflecting each piece of the flow characteristic information, wave characteristic information, and sea level characteristic information of the evaluation target region according to settings predetermined in classification contents of the ESI rank for the evaluation target region, and determining the final shoreline rank.

In addition, the shoreline evaluation unit may be configured to separately perform a process of determining the shoreline rank representing the static characteristics of the evaluation target region according to the ESI rank of the evaluation target region on a basis of the static characteristic data of the evaluation target region, the static characteristic data being collected through the data collection unit, and a process of determining the shoreline rank representing the dynamic characteristics of the evaluation target region by evaluating the flow characteristic information, wave characteristic information, and sea level characteristic information of the evaluation target region according to the predetermined settings and a predetermined criteria on a basis of the dynamic characteristic data of the evaluation target region, the dynamic characteristic data being collected through the data collection unit.

In addition, the output unit may be configured to perform a process of visually displaying, through a separate display means such as a monitor or a display, the various types of data including the evaluation result and the shoreline rank of the shoreline evaluation unit and the various types of information representing the overall process and result of the system.

Moreover, the controller may be configured to perform a process of displaying the various types of data including the evaluation result and the shoreline rank of the shoreline evaluation unit through the output unit as well as a process of transmitting the various types of data to the external device including a user terminal or a server through the communication unit.

Another aspect is a shoreline evaluation method using a dynamic characteristic-reflected shoreline evaluation system as described above, the shoreline evaluation method including: a data collection step of performing a process of collecting various types of information for shoreline evaluation of an evaluation target region by a data collection unit of the shoreline evaluation system; a shoreline evaluation step of performing a process of determining a shoreline rank reflected with static characteristics and dynamic characteristics of the evaluation target region on a basis of data collected through the data collection step by a shoreline evaluation unit of the shoreline evaluation system; and a data output step of respectively performing, by an output unit and a communication unit of the shoreline evaluation system, processes of outputting various types of data including a processing result of the shoreline evaluation step and transmitting the data to an outside according to a predetermined setting.

Another aspect is a marine response system, including: a plurality of shoreline evaluation systems installed in respective regions and configured to perform a process of determining a shoreline rank by reflecting static characteristics and dynamic characteristics according to a predetermined setting; a response server configured to perform not only a process of creating big data on the shoreline rank and shoreline evaluation for each region and providing various types of corresponding information customized according to users' requests by way of receiving data on a shoreline rank determination result of a corresponding region from each shoreline evaluation system and storing the data in a database, but also a process of creating a response information map (an ESI Map) and establishing a response plan according to the setting predetermined on a basis of the shoreline rank determination result stored in the database in an event of a coastal pollution accident in a specific region, so as to transmit the response information map and response plan to a predetermined contact point; and a user terminal configured to perform a process of checking, by each user, the various types of information on the shoreline rank and the shoreline evaluation of each region, and transmitting and receiving various types of data by communicating with each shoreline evaluation system and the response server in order to request and receive desired information, wherein each shoreline evaluation system may perform a process of using a dynamic characteristic-reflected shoreline evaluation system as described above, so as to determine the shoreline rank by reflecting both of the static characteristics and dynamic characteristics of the corresponding region, and transmit the various types of data obtained in an evaluation process to the response server.

Here, the user terminal may be configured by installing a dedicated application program on an information processing device including a PC or a laptop, or on a personal portable information communication terminal including a smartphone and a tablet PC.

Another aspect is a marine response method, including: a system construction step of installing, in respective regions, a plurality of shoreline evaluation systems configured to perform a process of determining a shoreline rank by reflecting static characteristics and dynamic characteristics; and a response step of performing a process of receiving, from a response server, data on a shoreline rank determination result of a corresponding region from each shoreline evaluation system installed in the system construction step, so as to create big data on the shoreline rank and shoreline evaluation for each region, and performing a process of creating a response information map (an ESI Map) and establishing a response plan according to a setting predetermined on a basis of the data stored in a database in an event of a coastal pollution accident in a specific region, so as to transmit the response information map and response plan to a predetermined contact point, wherein each shoreline evaluation system may configured by using a dynamic characteristic-reflected shoreline evaluation system as described above.

As described above, according to the present disclosure, there is provided the dynamic characteristic-reflected shoreline evaluation system and the method thereof configured to determine the shoreline rank by reflecting, in addition to the shoreline evaluation based on the existing ESI rank, the coastal dynamic characteristics such as seawater flow characteristics including flow velocities, flow directions, and spatial distributions of tidal currents, sea currents, and offshore currents, wave characteristics including wave heights and wave breaker zones, and sea level characteristics including approximate lowest low water, approximate highest high water, extreme sea level heights, and the like.

In addition, according to the present disclosure, as described above, there is provided the dynamic characteristic-reflected shoreline evaluation system and the method thereof configured to determine a shoreline rank by reflecting the dynamic characteristics of the corresponding shore along with the existing ESI rank so as to perform shoreline evaluation reflected with both of the static and dynamic characteristics of the shore, thereby enabling to solve the problems of the shoreline evaluation method based on the Environmental Sensitivity Index (ESI) rank of the related art having limitations that make the method unable to perform effective response in the event of coastal pollution because of not reflecting dynamic characteristics of a shore due to the shoreline evaluation method configured to determine the shoreline ranks in a static method based simply on the shapes of shorelines even though dynamic shoreline evaluation along with static shoreline evaluation is essentially required in general for pollutant removal and shore restoration in the event of coastal pollution.

In addition, according to the present disclosure, as described above, there is proposed the marine response system and the method thereof configured to use the dynamic characteristic-reflected shoreline evaluation system and the method thereof configured to reflect both static and dynamic characteristics for a shore and enable performing more effective and practical shoreline evaluation, so as to determine a shoreline rank, establish a response plan by creating an Environmental Sensitivity Index map (an ESI Map) according to a shoreline evaluation result, and carry out response work for pollutants, whereby more rapid and efficient response work may be performed in comparison with the conventional method.

BRIEF DESCRIPTION OF THE DRAWINGS

FIG. 1 is a view illustrating an ESI rank classification system for Korean coasts, the system being organized in a table.

DETAILED DESCRIPTION

Figure 2:
FIG. 2 is a view illustrating examples of ESI rank classification, which is shown in FIG. 1, organized in a table.

In general, various fishery or fish farms are distributed near shorelines, and various facilities for beaches, leisure, tourism, and the like are scattered on shorelines.

In addition, as described above, as the occurrences of marine accidents increase and various facilities are installed near the shorelines, recently, for example, a probability of various marine pollution accidents occurring, such as a fuel spill from a ship due to an accident, is also increasing, and accordingly, there is a growing demand for measures to quickly response marine pollution in an event of a marine pollution accident.

Here, as described above, as an example of the related art regarding an apparatus and a method for pollutant response in an event of a marine pollution accident, first, there is provided a patent titled as "COASTLINE RESPONSE METHOD GENERATION APPARATUS AND THE METHOD THEREOF FOR RESPONSE TO OIL AND HAZARDOUS AND NOXIOUS SUBSTANCE (HNS) SPILL ACCIDENTS AT SEA", as proposed in Korean Patent No. 10-1963320.

More particularly, the Korean Patent No. 10-1963320 described above relates to the shoreline response method generation apparatus and the method thereof for responding to marine pollution accidents, the apparatus and the method thereof including: a storage configured to store shoreline partitioning reference information and shoreline classification-specific response method information, which are classified according to shoreline characteristic information prepared to enable establishing an on-site pollution investigation and response measures for rapid coastal pollution response in an event of a marine pollution accident caused by oil and hazardous and noxious substances (HNS) in the sea; an input unit configured to receive map information including coastal characteristic information, coordinate information, and image map information of a coastal partitioning target coast; a map information analysis unit configured to analyze the map information input through the input unit and extract the coastal characteristic information for each coastal region; a coastal partitioning unit configured to partition the shore according to the coastal characteristic information extracted by the map information analysis unit; and a coastal response method generation unit configured to generate a coastal response method by using the coastal classification-specific response method information stored in the storage according to coastal characteristics of the divided coastal partitions, wherein the apparatus and the method thereof is configured to enable responding to the marine pollution accidents quickly and efficiently by dividing partitions for establishing a response strategy in consideration of the coastal characteristics such as work efficiency, physical shape, sedimentation environment, and response work.

In addition, as described above, as another example of the related art for an apparatus and a method thereof for pollutant response in an event of a marine pollution accident, there is a patent titled as "ESI MAP SERVICE APPARATUS FOR HNS SPILL RESPONSE", as proposed in Korean Patent No. 10-1848829.

More specifically, the Korean Patent No. 10-1848829 relates to an apparatus for providing a hazardous and noxious substance response information map in order to enable an efficient response to pollution accidents of ocean hazardous and noxious substances (HNS) spills, the apparatus including: an HNS response information map provision sever configured to provide an HNS response information map provision service; a user terminal configured to include a personal computer configured to receive a provision of the HNS response information map provision service by loading a client program for connecting wired or wirelessly to the HNS response information map provision sever through a communication network and for performing communication with the HNS response information map provision sever; and a portable terminal configured to include a mobile communication terminal configured to connect wirelessly to the HNS response information map provision sever through the communication network and receive a provision of the HNS response information map provision service by installing a mobile application for performing the communication with the HNS response information map provision sever, wherein the apparatus is configured to perform efficient response for ocean HNS pollution accidents by setting a priority response target region at the time of HNS spills on the basis of the Environmental Sensitivity Index (ESI) of a shoreline.

As described above, in the related art, various apparatuses and methods have been proposed for pollutant response in the event of a marine pollution accident, but the contents of the related art as described above have the following limitations.

That is, in order to more quickly and efficiently remove pollutants in the event of a marine pollution accident, it is very important not only to simply select a response method applicable according to the type of pollutants, but also to establish an appropriate response plan by reflecting coastal characteristics, such as geographical characteristics or environmental characteristics of a corresponding region.

Accordingly, as described above, in order to establish the response plan by reflecting the coastal characteristics, generally and conventionally, a shoreline evaluation method for determining a shoreline rank according to the ESI rank classified on the basis of a shoreline shape by using the Environmental Sensitivity Index (ESI) is widely applied.

Here, in order to carry out quick and efficient pollutant removal and shore restoration in the event of a marine pollution accident, shoreline evaluation on dynamic characteristics such as seawater flows, waves, and sea levels in a corresponding region is essentially required along with shoreline evaluation on static characteristics such as the shapes of shorelines. However, there is a limitation that an existing shoreline evaluation method according to the ESI rank as described above is just a static evaluation method based simply on the shapes of shorelines.

In addition, as proposed in the contents of the related art, in general, most of marine pollution response apparatuses and methods in the related art are configured to establish response plans according to the ESI rank based on Environmental Sensitivity Index (ESI) for a corresponding region in the events of marine pollution accidents, whereby there is also a limitation that more practical and efficient response plans are not established because dynamic characteristics are not reflected and only the static characteristics are reflected in shoreline evaluation.

Accordingly, in order to solve the limitations of the shoreline evaluation apparatuses and the methods thereof and the marine pollution response apparatuses and the methods thereof in the related art as described above, it is preferable to propose a shoreline evaluation apparatus and a method thereof having a new configuration capable of establishing a more practical and efficient response plan by reflecting both static and dynamic characteristics of a shore and determining a shoreline rank. However, in reality, an apparatus or method that satisfies all such requirements has not yet been proposed.

Hereinafter, with reference to the accompanying drawings, a specific exemplary embodiment of a dynamic characteristic-reflected shoreline evaluation system and a method thereof according to the present disclosure will be described.

Here, it should be noted that the contents described below are only one exemplary embodiment for realizing the present disclosure, and the present disclosure is not limited only to the contents of the exemplary embodiments described below.

In addition, in the following description of the exemplary embodiments of the present disclosure, it should be noted that the detailed description has been omitted in order to simplify the description for parts that are identical or similar to the contents of the related art, or are determined to be easily understood and implemented at the level of those skilled in the art.

That is, as described below, the present disclosure relates to a dynamic characteristic-reflected shoreline evaluation system and a method thereof configured to determine a shoreline rank by reflecting dynamic characteristics of a corresponding shore along with static evaluation based on an existing ESI rank in order to solve problems of a shoreline evaluation method based on the Environmental Sensitivity Index (ESI) of the related art having limitations that make the method unable to perform effective response in the event of coastal pollution due to determining a shoreline rank in a static method based simply on a shoreline shape without reflecting the dynamic characteristics of a shore even though dynamic shoreline evaluation along with static shoreline evaluation is essentially required in general for pollutant removal and shore restoration in an event of coastal pollution, thereby enabling the shoreline evaluation reflected with both of the static and dynamic characteristics of the shore to be performed.

In addition, as described below, the present disclosure relates to a dynamic characteristic-reflected shoreline evaluation system and a method thereof configured to determine the shoreline rank by reflecting, in addition to the shoreline evaluation based on the existing ESI rank, the coastal dynamic characteristics such as seawater flow characteristics including flow velocities, flow directions, and spatial distributions of tidal currents, sea currents, and offshore currents, wave characteristics including wave heights and wave breaker zones, and sea level characteristics including approximate lowest low water, approximate highest high water, extreme sea level heights, and the like, in order to solve the problems of the shoreline evaluation method based on the ESI rank of the related art having limitations that make the method unable to effectively and practically perform the shoreline evaluation because of not reflecting the dynamic characteristics of a shore due to merely considering the static characteristics based simply on a shoreline shape, thereby enabling more effective and practical shoreline evaluation to be performed by reflecting both of the static and dynamic characteristics of the shore.

Furthermore, as described below, the present disclosure relates to a marine response system and a method thereof configured to perform a process of determining a shoreline rank by using a dynamic characteristic-reflected shoreline evaluation system and a method thereof configured to reflect both static characteristics and dynamic characteristics of a shore and perform more effective and practical shoreline evaluation, and a process of establishing a response plan by creating a response information map (i.e., an ESI Map) according to a shoreline evaluation result, thereby enabling response work for pollutants to be performed more quickly and efficiently.

Next, with reference to the drawings, the detailed contents of the dynamic characteristic-reflected shoreline evaluation system and the method thereof according to the present disclosure will be described.

More specifically, first, referring to FIGS. 1 and 2, each of FIGS. 1 and 2 illustrates conventional ESI rank classification. FIG. 1 is a view illustrating an ESI rank classification system for Korean coasts, the system being organized in a table, and FIG. 2 is a view illustrating examples of ESI rank classification, which is shown in FIG. 1, organized in a table.

As shown in FIGS. 1 and 2, the existing ESI rank is for classifying shoreline ranks into a total of 10 ranks from rank 1 to rank 8 (i.e., 8A and 8B) on the basis of the shapes of shorelines and corresponding general characteristics of the shorelines. The shoreline evaluation based on such ESI rank is reflected in various fields, such as a field of establishing a marine pollution response plan.

Here, in order to perform quick and efficient pollutant removal and restoration in the event of a marine pollution accident, shoreline evaluation on dynamic characteristics such as seawater flows, waves, and sea levels in a corresponding region is essentially required along with shoreline evaluation on static characteristics such as the shapes of shorelines. However, there a limitation in that an existing shoreline evaluation method according to ESI rank as described above is just a static evaluation method based simply on the shapes of shorelines, so there is a limitation that the shoreline evaluation based on the ESI rank alone does not ensure the best response plan.

In addition, for example, contents about topography exposed to waves are presented in ESI rank 1 and ESI rank 2 shown in FIGS. 1 and 2, so it may be said that wave characteristics are partially considered, but this only means whether the topography is exposed to the waves or not, and it may not be said that dynamic characteristics are considered because there is no consideration of wave characteristics such as wave strength, breaking wave zones, or the like.

Accordingly, in order to solve the limitations of shoreline evaluation based on the existing ESI rank, which has the limitations that only static characteristics are reflected and dynamic characteristics are not reflected as described above, the present disclosure proposes the dynamic characteristic-reflected shoreline evaluation system and the method thereof as described below.

Figure 3:
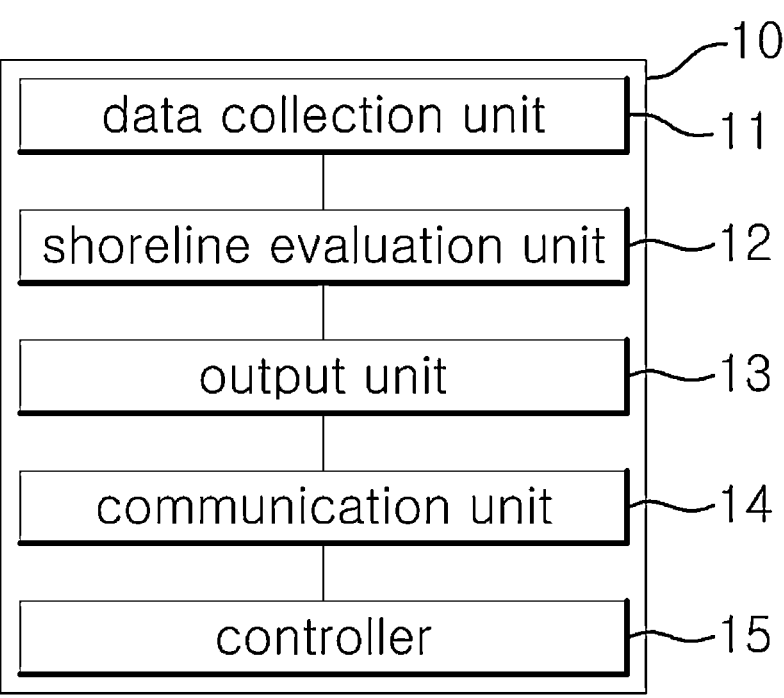
FIG. 3 is a view schematically illustrating the overall configuration of a dynamic characteristic-reflected shoreline evaluation system according to the exemplary embodiment of the present disclosure.

More specifically, referring to FIG. 3, FIG. 3 is a block diagram schematically illustrating the overall configuration of the dynamic characteristic-reflected shoreline evaluation system 10 according to the exemplary embodiment of the present disclosure.

As shown in FIG. 3, according to the exemplary embodiment of the present disclosure, the dynamic characteristic-reflected shoreline evaluation system 10 may be configured to include in large: a data collection unit (a data collection processor) 11 configured to perform a process of collecting various types of information for shoreline evaluation of an evaluation target region; a shoreline evaluation unit (a shoreline evaluation processor) 12 configured to perform a process of determining a shoreline rank by reflecting static and dynamic characteristics of the evaluation target region on the basis of data collected through the data collection unit 11; an output unit (or an output processor) 13 configured to perform a process of outputting the various types of information including the overall process and result of the system 10; a communication unit (or a communication processor) 14 configured to perform a process of transmitting and receiving various types of data through wired or wireless communication with an external device; and a controller 15 configured to perform a process of controlling the overall operation of the respective units and system 10 described above.

Here, the data collection unit 11 may be configured to perform a process of creating a database of static and dynamic characteristics of each evaluation target region by receiving an input of the various types of data including data on the static characteristics and data on the dynamic characteristics of each evaluation target region through a separate input means or by receiving the data from the outside through the communication unit 14.

More specifically, the static characteristic data may be organized to include, for example, ESI rank information for a corresponding region, and the dynamic characteristic data may be organized to include, for example, flow characteristic information, wave characteristic information, and sea level characteristic information of the corresponding region.

In addition, the flow characteristic information may be organized to include, for example, flow velocities, flow directions, and spatial distributions of tidal currents, ocean currents, offshore currents, and the like in the corresponding region. The wave characteristic information may be organized to include wave heights and breaking wave zones, etc. The sea level characteristic information may be organized to include approximate lowest low water, approximate highest high water, extreme sea level heights, etc.

In addition, on the basis of the static characteristic data and dynamic characteristic data, collected through the data collection unit 11 as described above, of the evaluation target region, the shoreline evaluation unit 12 may be configured to individually perform the evaluation on the static characteristics and evaluation on the dynamic characteristics of the evaluation target region.

More specifically, for example, the shoreline evaluation unit 12 may be configured to perform a process of generating a shoreline evaluation result in which both static and dynamic characteristics are all reflected by way of performing the evaluation on the static characteristics of the corresponding region on the basis of the existing ESI rank information obtained, and reflecting the flow characteristic information, wave characteristic information, and sea level characteristic information of the corresponding region according to a predetermined setting for such ESI rank, so as to determine a final shoreline rank.

Here, as described above, for example, the shoreline rank in which both static and dynamic characteristics are all reflected may be determined by using the classification based on the existing ESI rank as it is, and by appropriately adding a dynamic characteristic to each item.

Alternatively, for example, in addition to the ESI rank, the shoreline evaluation unit 12 may also be configured such that a shoreline rank representing static characteristics and a shoreline rank representing dynamic characteristics are separately determined by way of separately assigning the shoreline rank of which the dynamic characteristics are evaluated according to a predetermined setting, and thus it should be noted that the present disclosure may be configured in various ways as required.

Further, as described above, the output unit 13 may be configured to perform a process of visually displaying, through a separate display means such as a monitor or a display, various types of data including the shoreline rank and result of evaluation performed by the shoreline evaluation unit 12 and the various types of information representing the results and the overall process of the system 10.

In addition, as described above, the controller 15 may be configured to perform a process of displaying, through the output unit 13, various types of data including the shoreline rank and the results of evaluation performed by the shoreline evaluation unit 12 as well as a process of transmitting the data to an external device such as a user terminal or a server through the communication unit 14.

Accordingly, by configuring as described above, the dynamic characteristic-reflected shoreline evaluation system 10 according to the exemplary embodiment of the present disclosure may be implemented, and by using the implemented system, according to the present disclosure, a shoreline evaluation method configured to perform a process of determining a shoreline rank by way of executing the above-described process through a computer or dedicated hardware may be easily implemented.

In addition, according to the present disclosure, by using the dynamic characteristic-reflected shoreline evaluation system 10 and the method thereof according to the exemplary embodiment of the present disclosure configured as described above, a marine response system and a method thereof for carrying out response work for pollutants in an event of a marine pollution accident may be easily implemented.

Figure 4:
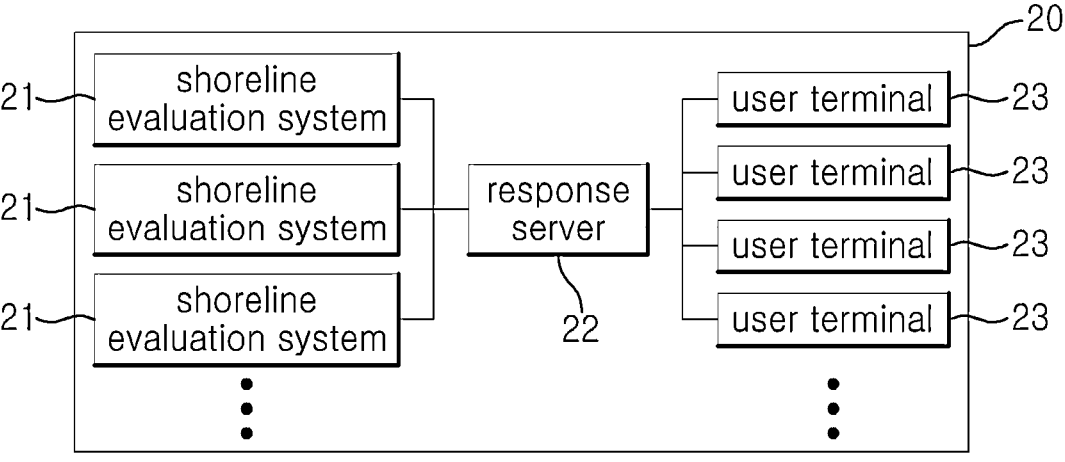
FIG. 4 is a block diagram schematically illustrating the overall configuration of a marine response system using the dynamic characteristic-reflected shoreline evaluation system according to the exemplary embodiment of the present disclosure.

That is, referring to FIG. 4, FIG. 4 is a block diagram schematically illustrating the overall configuration of a marine response system using a dynamic characteristic-reflected shoreline evaluation system 10 according to the exemplary embodiment of the present disclosure.

As shown in FIG. 4, according to the exemplary embodiment of the present disclosure, the marine response system 20 may be configured to include in large: a plurality of shoreline evaluation systems 21 installed in respective regions and configured to perform a process of determining a shoreline rank according to a predetermined setting; a response server 22 configured to perform not only a process of creating big data on the shoreline rank and shoreline evaluation for each region and providing various types of corresponding information according to users' requests by way of receiving data on a shoreline rank determination result of a corresponding region from each shoreline evaluation system 21 and storing the data in a database, but also a process of creating a response information map (i.e., an ESI map) and establishing a response plan according to a setting predetermined on the basis of the shoreline rank determination result reflected with static and dynamic characteristics of the corresponding region stored in the database in an event of a coastal pollution accident in a specific region, so as to transmit the response information map and response plan to a predetermined contact point; and a user terminal 23 configured to perform a process of confirming, by each user, various types of information on the shoreline rank and shoreline evaluation for each region, and transmitting and receiving various types of data by communicating with each shoreline evaluation system 21 and the response server 22 in order to request and receive desired information.

Here, by using the dynamic characteristic-reflected shoreline evaluation system 10 configured as described above by referring to FIGS. 1 to 3 according to the exemplary embodiment of the present disclosure, the shoreline evaluation system 21 may be configured to perform a process of determining a shoreline rank by reflecting both static characteristics and dynamic characteristics of a corresponding region and transmitting various types of data obtained in an evaluation process to the response server 22.

In addition, the user terminal 23 may be configured by using a terminal device such as a PC, or may also be configured by installing a dedicated application in an information communication terminal, which may be carried by an individual, such as a smart phone, a tablet PC, or a laptop computer, so it should be noted that the user terminal 23 may be configured in various ways as required.

According to the present disclosure based on the configuration described above, the shoreline evaluation system 21 is installed for each region to determine the shoreline rank for each region, the response server 22 creates, in the event of the marine pollution accident occurred in the specific region, the response information map (i.e., the ESI Map) according to the shoreline rank determination result of which the static and dynamic characteristics of the corresponding region stored in the database are reflected, and the response plan is established to be transmitted to the user terminal 23 of the predetermined contact point, such as a related institution, a department in charge, or a person in charge, thereby enabling easy implementation of a large-scale marine response system 20 and a method thereof configured to not only perform more rapid and efficient response work in comparison with an existing method, but also be applied to a national-wide extensive region as an example.

Here, as described above, more specific details of the process of using the shoreline rank information to create the response information map (ESI Map) and establish the response plan are contents that may be properly embodied by those skilled in the art by referring to the configuration of the existing apparatus and the method thereof for providing a response information map (an ESI Map) or the configuration of the marine pollution response system and the method thereof, and accordingly, in the present disclosure, it should be noted that in order to simplify the description, a detailed description has been omitted for contents that may be easily understood and implemented by those skilled in the art with reference to documents, and the like of the related art, as described above.

Accordingly, as described above, the dynamic characteristic-reflected shoreline evaluation system and the method thereof according to the exemplary embodiment of the present disclosure may be implemented, and by this system and the method thereof, according to the present disclosure, there is provided the system and the method thereof configured to determine the shoreline rank by reflecting, in addition to the shoreline evaluation based on the existing ESI rank, the coastal dynamic characteristics such as: seawater flow characteristics including flow velocities, flow directions, and spatial distributions of tidal current, sea currents, and offshore current; wave characteristics including wave heights and breaking wave zones; and sea level characteristics including approximate lowest low water, approximate highest high water, extreme sea level heights, and the like, so that more effective and practical shoreline evaluation may be performed by reflecting both of the static and dynamic characteristics of the shore.

In addition, according to the present disclosure, as described above, there is provided the dynamic characteristic-reflected shoreline evaluation system and the method thereof configured to perform shoreline evaluation in which both of the dynamic characteristics and dynamic characteristics of the corresponding shore are all reflected by way of reflecting the dynamic characteristics of the corresponding shore along with the existing ESI rank so as to determine the shoreline rank, whereby the embodiment of the present disclosure may solve problems of the shoreline evaluation method based on the ESI rank of the related art having the limitations that make the method unable to perform effective measures in the event of the coastal pollution because the dynamic characteristics of the shore are not reflected due to the system and the method thereof configured to determine the shoreline rank in the static method based simply on the shapes of shorelines even though the dynamic shoreline evaluation along with the static shoreline evaluation is essentially required for pollutant removal and shore restoration in the event of coastal pollution.

In addition, according to the present disclosure, as described above, there is provided the marine response system and the method thereof configured to determine the shoreline rank by using the dynamic characteristic-reflected shoreline evaluation system and the method thereof configured to perform more effective and practical shoreline evaluation by reflecting both of the static and dynamic characteristics for the shore, establish the response information map (i.e., the ESI Map) according to the result of evaluation, and carry out response work for the pollutants, whereby more quick and efficient response work may be performed in comparison with the existing method.

In the above, the details of the dynamic characteristic-reflected shoreline evaluation system and the method thereof according to the present disclosure have been described through the exemplary embodiments of the present disclosure as described above, but the present disclosure is not limited only to the contents described in the above exemplary embodiments. Therefore, it is natural that the present disclosure can be variously modified, changed, combined, replaced, and the like according to design requirements and other various factors by those skilled in the art to which the present disclosure belongs.

What is claimed is:

1. A dynamic characteristic-reflected shoreline evaluation system implemented by a computer or dedicated hardware, the system comprising:

a data collection processor configured to collect various types of information for shoreline evaluation with respect to an evaluation target region, the various types of information including static characteristic data on static characteristics of the evaluation target region and dynamic characteristic data on dynamic characteristics of the evaluation target region;

a shoreline evaluation processor configured to determine a shoreline rank by executing a shoreline evaluation process that reflects static characteristics together with dynamic characteristics that cannot be evaluated based only on shoreline shape of the evaluation target region on a basis of data collected through the data collection unit;

an output processor configured to output the various types of information comprising an evaluation result of the shoreline evaluation unit and an overall process and result of the system;

a communication processor configured to transmit and receive various types of data through wired or wireless communication with an external device; and a controller configured to control an overall operation of the system, including controlling the output processor to display the shoreline rank and the evaluation result of the shoreline evaluation processor and controlling the communication processor to transmit the various types of data to an external device, wherein the controller is further configured to organize:

the static characteristic data to include environmental sensitivity index (ESI) rank information for the evaluation target region, the dynamic characteristic data to include flow characteristic information, wave characteristic information, and sea level characteristic information for the evaluation target region, the flow characteristic information to include information on current velocities, current directions, and spatial distributions of tidal currents, sea currents, and offshore currents in the evaluation target region, the wave characteristic information to include information on wave heights and breaking wave zones in the evaluation target region, and the sea level characteristic information to include information on approximate lowest low water, approximate highest high water, and extreme sea level heights of the evaluation target region, wherein the shoreline evaluation processor is further configured to:

generate a shoreline rank representing static characteristics of the evaluation target region on a basis of the ESI rank information included in the static characteristic data, generate a shoreline rank representing dynamic characteristics of the evaluation target region by computationally evaluating the flow characteristic information, wave characteristic information, and sea level characteristic information according to settings predetermined in classification contents of the ESI rank information and predetermined evaluation criteria, integrate the shoreline rank representing the static characteristics and the shoreline rank representing the dynamic characteristics to generate an ESI rank determination result reflected with both of the static characteristics and the dynamic characteristics, determine a final shoreline rank that enables practical and effective shoreline evaluation for pollutant removal and shore restoration that cannot be achieved through static ESI-based evaluation alone, and wherein the controller is further configured to control the communication processor to transmit the ESI rank determination result to a response server and, based on the transmitted ESI rank determination result reflected with both the static and dynamic characteristics, to cause the response server to create a response information map and a response plan and to transmit the response information map and the response plan to a user terminal.

2. The system of claim 1, wherein the data collection processor is configured to:

receive, through a separate input means, an input of the various types of data comprising static characteristic data for the static characteristics and dynamic characteristic data for the dynamic characteristics of the evaluation target region, or create a database for the static characteristics and dynamic characteristics of the evaluation target region by receiving the various types of data from an outside through the communication processor.

3. The system of claim 1, wherein the shoreline evaluation processor is configured to:

separately determine the shoreline rank representing the static characteristics of the evaluation target region according to the ESI rank information of the evaluation target region on a basis of the static characteristic data of the evaluation target region, the static characteristic data being collected through the data collection processor, and determine the shoreline rank representing the dynamic characteristics of the evaluation target region by evaluating the flow characteristic information, wave characteristic information, and sea level characteristic information of the evaluation target region according to the predetermined settings and a predetermined criteria on a basis of the dynamic characteristic data of the evaluation target region, the dynamic characteristic data being collected through the data collection processor.

4. The system of claim 1, wherein the output processor is configured to visually display, through a separate display means such as a monitor or a display, the various types of data comprising the evaluation result and the shoreline rank of the shoreline evaluation processor and the various types of information representing the overall process and result of the system.

5. The system of claim 1, wherein the controller is configured to:

display the various types of data comprising the evaluation result and the shoreline rank of the shoreline evaluation processor through the output processor; and transmit the various types of data to the external device comprising a user terminal or a server through the communication processor.

\* \* \* \* \*